Patented Apr. 26, 1932

1,855,210

UNITED STATES PATENT OFFICE

SAMUEL F. WALTON, OF HAMBURG, NEW YORK, ASSIGNOR, BY MESNE ASSIGNMENTS, TO THE PATENT AND LICENSING CORPORATION, OF BOSTON, MASSACHUSETTS, A CORPORATION OF MASSACHUSETTS

NONWEATHERING GLAZED AGGREGATE AND METHOD OF PREPARING THE SAME

No Drawing.   Application filed April 23, 1928. Serial No. 272,346.   REISSUED

The invention herein concerned is related primarily to materials such as coatings for roofings, shingles, strips or other forms which have a non-combustible material carried on an impregnated or coated base. The usual material has been slate or like material in flaked or chipped condition. Such material is not expensive, but it fails utterly to give any range of color such as is desired.

For such purposes there are several things much desired. These are not met in nature, and artificial resources have been taxed unsuccessfully to meet the desiderata. This demand is based on cheapness, non-combustibility and potential color factors. I have conceived of a basis of material and color so comprised as to make low cost possible and a suitable range of color available. By my concept I take a waste or by-product material, preferable of silicious nature such as a silicate. Of these there are many, mostly known as slags. In such I have a base or body of low cost. Moreover, slags are so porous and light that they are admirably adapted to roofing purposes and are, of course, absolutely incombustible and even resistant to heat.

The real problem is to provide the color factor. Here my concept brings together the base or material and the color concept.

Ordinary roofing material has as a basis a paper or fibrous stock. This is impregnated and coated with a binder which preferably impregnates the sheet and serves to retain the surface coating. This surface coating is really the important factor. It is the physical wear resistant factor and the retardant to fire.

For such a material much is available but the æsthetic factor comes in heavily in the merchandising problem. Architecturally, color is imperative. The materials heretofore used have been insufficient. Materials in nature do not supply the color factor. Here lies the problem.

According to my concept, I take a waste material such as slag and color it. The factor of color is one of expense, otherwise there would be no problem. I take such a material as slag which is useless as such. This I colorize so as to give it an inherent color factor. To do this I employ a glaze medium. This is effective on slag or any material having a porous or fused base.

I preferably use a soluble silicate having an affinity for a metallic oxide which will thereby render it insoluble. Such an oxide I preferably use for my color factor. In nature these oxides are plentiful and easily combined with a silicious glaze so that according to my invention I am able to convert a useless product like slag to a highly specialized material.

In practice I take such a material as furnace slag and grind to convenient size. I then mix this slag with a soluble silicate such as sodium silicate and combine with it a metallic oxide of characteristic color. When heated to about 450° to 500° F. the sodium silicate chemically unites with the metallic oxide pigments and with the surface of the slag granules to form an insoluble compound which is non-weathering, water-repellent, and fire retardant.

For example, I take a slag such as ordinary blast furnace slag which is a calcium silicate usually carrying a metallic content such as iron and manganese and this I grind to the desired size. For roofing material this is usually of a size which will pass through a 10 but will be retained by a 30 mesh screen. I prepare my color treatment by mixing sodium silicate and my color base preferably a metallic oxide. I choose this color base with reference to its ability to withstand heat at the desired temperatures without change. For a material of this size I preferably use a silicate undiluted in its ordinary commercial form commonly known as water glass which is of about 40° Baumé. I knead the color base into this. This brings the mixture to about the consistency of a syrup which is about right for the size of slag mentioned as suitable for roofing and like purposes. The slag is added to the syrup and thoroughly mixed at a low temperature so that it will dry out under agitation. When thoroughly mixed I then raise the temperature to about 450° F. to complete the drying and driving off a part of the combined water in the silicate. Care should be taken not to raise the temperature so high as completely to dehydrate the soluble silicate as at that temperature all of the chemically combined water would be driven off and the silicate would become granular and flake off.

However, it is possible to continue the rise in temperature so that there is an actual fusion between the oxide and the silicate and the surface of the slag. This occurs at about 1200° F. It would also be possible to carry the temperature up to the actual fusion point of the slag which would require recrushing.

Under the conditions of my invention the particles of slag will now be found to be coated with a thin colored glaze which penetrates the pores of the slag and gives it a strong permanent color. My process is a low temperature method of coloring certain silicious granules such as slag by means of a water soluble silicate and an insolubilizing and coloring oxide, as well as the colored granule resulting from such processes. The granules used have insoluble lime bearing silicate constituents, either natural or artificial, which constituents at the comparatively low temperatures specified chemically combine with the soluble silicate to fix the coloring to the granules. The combining action is a chemical union rather than a mere physical bond resulting in a permanency of color fixation the temperatures which heretofore were not thought possible. In addition to the chemical union of the silicate with the silicate constituent of the granule itself the silicate and the coloring oxide enter into a chemical union with each other forming a complex silicate or reaction product which combines chemically with the base. This may well be described as a dual reaction, first between the soluble silicate and the metallic oxide forming a complex silicate reaction product, and second between such complex reaction product and the silicate of the base. For purposes other than roofing, different sizes of slag particles may be used but in actual production of this material it is possible to so grind the slag that the sizes are varied. In fact, there is an incidental variance in the size of the slag particles during the grinding so that instead of actually screening at the outset for the desired size I usually treat the ground slag without screening and then subsequently sort the sizes within the limits desired.

The penetration of the pores of the slag above mentioned is quite complete so that even if the slag particles are subsequently broken during handling or in mechanical manipulation as in applying to roofing or shingles, the color values are not diminished. In fact, my colored slag particles may be divided and subdivided without material loss of color strength until practically reduced to a powder. Of course as a slag particle is broken down more and more of its original color is exposed but the penetration is such as to hold the color strength under any ordinary breakage that occurs.

Where a considerable quantity of any one of the smaller sizes is desired I preferably reduce the slag to that size and treat it on the basis of size. For sizes say from 10 to 50 mesh as stated above the silicate is used in undiluted form. For sizes ranging from 50 to 100 for instance, the silicate can be diluted slightly to advantage as the material seems to mix better. For finer sizes, especially around 200 and above, about 20% of water should be added in order to get a satisfactory basis of mixture.

I have mentioned slag as a very desirable base both as to porosity and as to availability at low price. Obviously other materials can be used and in some localities there are available either as natural deposits or as by-products or wastes which can be used. For example, there are silicate rocks which are essentially calcium silicate which can be used advantageously. Volcanic pumices and diatomaceous earths and burned clays being of a silicious nature may be used with the same success of bonding as in the case of the slag. The material while not necessarily a silicate is in accordance with my invention preferably so as the bonding of the color film is more intimate and the product more homogeneous where the base is a silicate.

For colors a great variety of materials may be used. Preferably these are metallic oxides or earthy materials carrying such oxides. For example, I find the following materials very well adapted for the indicated colors. For green I use a chrome oxide; for red an iron oxide; for blue I preferably use ultra-marine because while it is not a true oxide it acts as one and gives a very satisfactory color. For brown I preferably use an umber. This is a clay but carries an iron oxide which gives an excellent natural brown. For yellow ochre may be used and these colors can be combined for desired shades. For a black I may use a black oxide of iron and in connection with iron oxide I would point out that with such a material by carrying to suitable temperatures the color may be changed. In the case of black oxide of iron this can be oxidized to produce a red while if the cobalt is fused it will give a blue with the silicate.

While I have referred to my material generally with reference to a material for roofing purposes it will of course be understood that it may be used for a very great variety of purposes some of which are readily apparent and others will readily occur where the need exists. For example, my material may be used in various materials and mixtures, and in fact in almost any place and for almost any purpose where an inexpensive and durable coloring material is required. I do not therefore wish to be limited to any particular use, size or base of mixtures, as all such are within the purview of my invention.

Various modifications in the composition of my invention may be resorted to if within the spirit and scope of my invention without departing from the appended claims.

What I therefore claim and desire to secure by Letters Patent is:

1. In the method of artificially coloring a granule containing sufficient alkaline earth oxides and silica to react with water soluble silicates and coloring pigments at temperatures around 450° F., those steps which consist in mixing the granule with a coloring pigment and a water soluble silicate in the presence of water, in drying the coated granule, and in heating the dried granule to a reaction temperature which will form a permanent unfused water insoluble non-weathering coating on the granule.

2. In the method of artificially coloring a granule containing sufficient alkaline earth oxides and silica to react with water soluble silicates and coloring pigments at temperatures around 450° F., those steps which consist in mixing the granule with a coloring pigment and a water soluble silicate in the presence of water, in drying the coated granule, and in heating the dried granule to a reaction temperature of about 450° F. which will form a permanent unfused water insoluble non-weathering coating on the granule.

3. In the method of artificially coloring a granule containing sufficient lime silicate to react with water soluble silicates and coloring pigments at temperatures around 450° F., those steps which consist in mixing the granule with a coloring pigment and a water soluble silicate in the presence of water, in drying the coated granule, and in heating the dried granule to a reaction temperature which will form a permanent unfused water insoluble non-weathering coating on the granule.

4. In the method of artificially coloring a granule containing sufficient lime silicate to react with water soluble silicates and coloring pigments at temperatures around 450° F., those steps which consist in mixing the granule with a coloring pigment and a water soluble silicate in the presence of water, in drying the coated granule, and in heating the dried granule to a reaction temperature of about 450° F., which will form a permanent unfused water insoluble non-weathering coating on the granule.

5. In the method of artificially coloring a furnace slag granule containing sufficient alkaline earth oxides and silica to react with water soluble silicates and coloring pigments at temperatures around 450° F., those steps which consist in mixing the granule with a coloring pigment and a water soluble silicate in the presence of water, in drying the coated granule, and in heating the dried granule to a reaction temperature which will form a permanent unfused water insoluble non-weathering coating on the granule.

6. In a method of artificially coloring a furnace slag granule containing sufficient alkaline earth oxides and silica to react with water soluble silicates and coloring pigments at temperatures around 450° F., those steps which consist in mixing the granule with a coloring pigment and a water soluble silicate in the presence of water, in drying the coated granule, and in heating the dried granule to a reaction temperature of about 450° F., which will form a permanent unfused water insoluble non-weathering coating on the granule.

7. The product of the process of claim 1 consisting of a granule containing an insoluble alkaline earth silicate having a permanent unfused water insoluble non-weathering coating comprising the reaction product of the alkaline earth silicate, a soluble silicate, and a pigment.

8. The product of the process of claim 3 consisting of a granule containing an insoluble lime silicate having a permanent unfused water insoluble non-weathering coating comprising the reaction product of the lime silicate, a soluble silicate, and a pigment.

9. The product of the process of claim 5 consisting of a furnace slag granule containing an insoluble alkaline earth silicate having a permanent unfused water insoluble non-weathering coating comprising the reaction product of alkaline earth silicate, a soluble silicate, and a pigment.

In testimony whereof I affix my signature.

SAMUEL F. WALTON.